United States Patent [19]
Mead

[11] Patent Number: 4,949,026
[45] Date of Patent: Aug. 14, 1990

[54] ROBOT ARM SPACE STABILIZER

[76] Inventor: John A. Mead, 506 Treetop Dr., Virginia Beach, Va. 23451

[21] Appl. No.: 129,589

[22] Filed: Dec. 7, 1987

[51] Int. Cl.⁵ .......................................... B64C 17/06
[52] U.S. Cl. ................................... 318/649; 74/5.47; 318/568.22
[58] Field of Search ................. 318/646, 10, 648, 649, 318/689, 567, 568.11, 568.16, 568.22; 74/5 F, 5.34, 5.4, 5.47

[56] References Cited

U.S. PATENT DOCUMENTS

| | | | |
|---|---|---|---|
| 3,775,656 | 11/1973 | Romans | 318/649 |
| 3,854,378 | 12/1974 | Vogel | 318/649 |
| 3,936,716 | 2/1976 | Bos | 318/649 |
| 4,052,654 | 10/1977 | Kramer et al. | 318/649 |
| 4,525,659 | 6/1985 | Imahash et al. | 318/649 |
| 4,562,391 | 12/1985 | Inoue | 318/649 |
| 4,645,994 | 2/1987 | Giancola et al. | 318/649 |
| 4,680,521 | 7/1987 | Hofman | 318/649 |
| 4,757,980 | 7/1988 | Schubert | 318/649 |

Primary Examiner—William M. Shoop, Jr.
Assistant Examiner—David Martin

[57] ABSTRACT

As a gyroscope is made to precess back and forth across a certain point; a servo, torquing about the axis causing precession, can stabilize the member containing the precession axis by maintaining the gyroscope at that point. In the subject invention, a signal generator measuring gyro movement on the precession axis, energizes the servo at the hinge between the member and its support toward the base and thus stabilizes said member against accidental oscillation of said support. After adding to the precession axis a velocity sensitive means for restraining gyro motion along with means for displacing the signal generator null, the servo will torque, and henceforth stabilize, the member to a new attitude signified by the angular displacement of the null. Momentum of the gyro wheel remembers its position in space and will return the member to its original null. In this manner, up to three orthogonally servoed robot arms may be space stabilized with attitude changes commanded remotely.

3 Claims, 2 Drawing Sheets

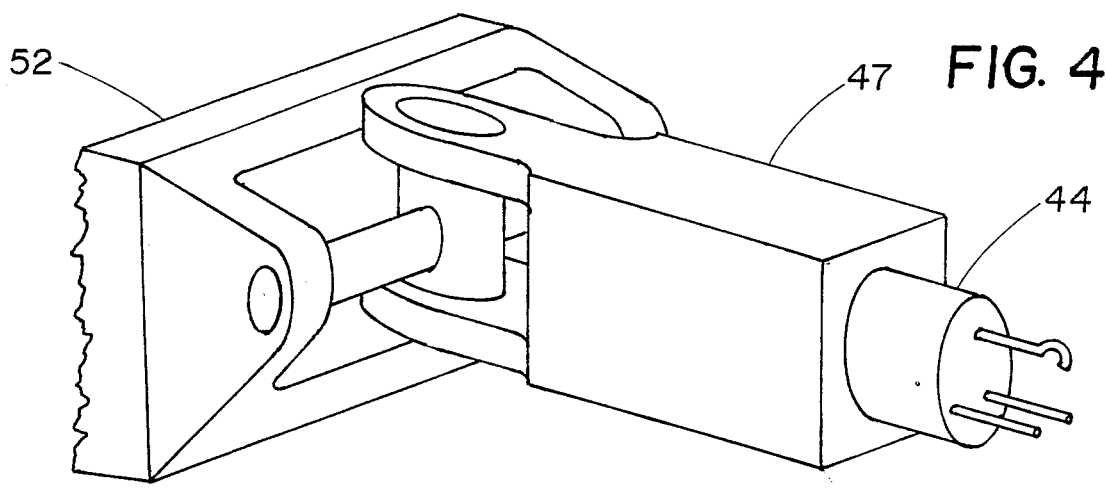
FIG. 4
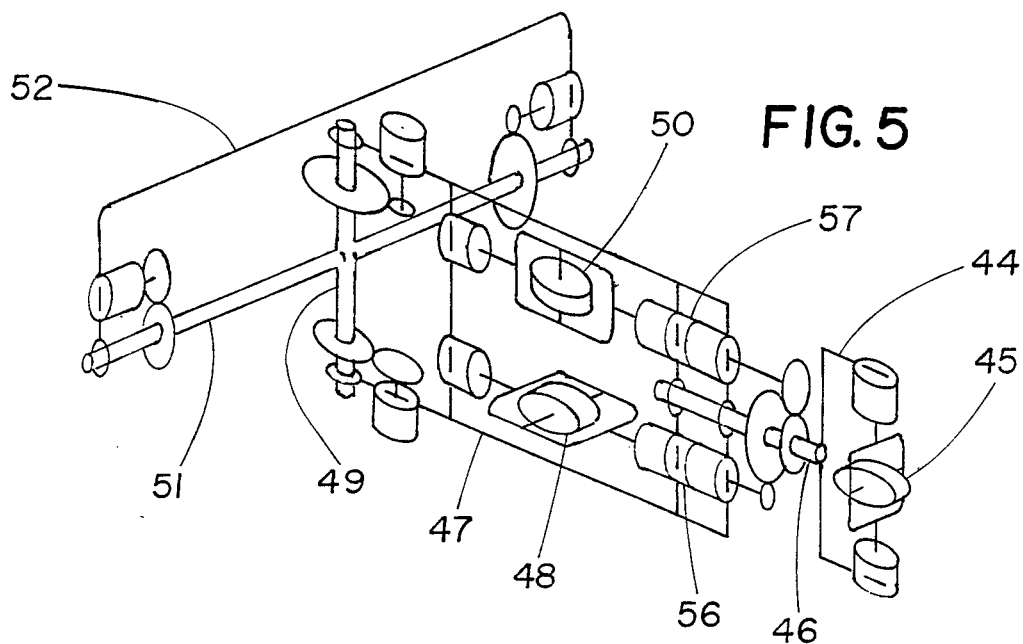
FIG. 5
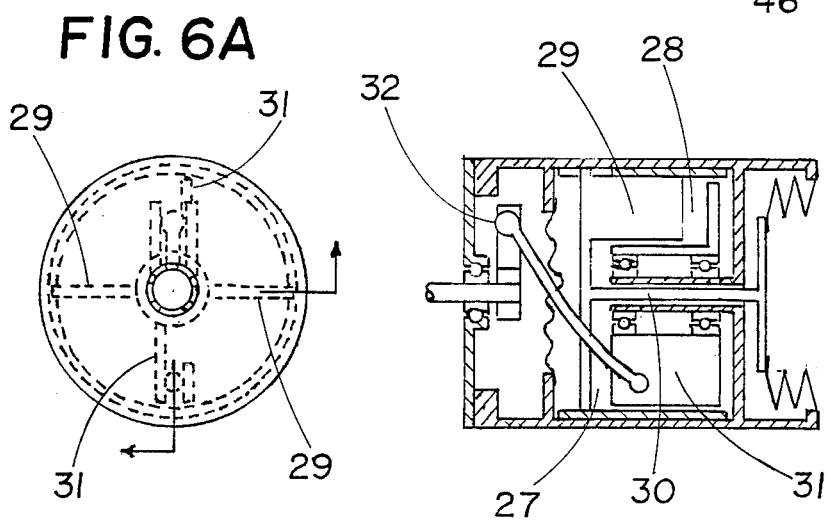
FIG. 6A
FIG. 6B

ROBOT ARM SPACE STABILIZER

BACKGROUND

The classic approach to instrument stabilization has been to build an inner stable platform surrounded by gimbal axes carrying a position transmitter or synchro at each. The gimbaling of this transmitter structure must be duplicated, or complicated coordinate transformers added, at the site of the manipulators where synchro receivers repeat the transmitter angles for positioning the robot arms. There is a need in the field of robotics for stabilizing the arm members against random movement of their base in a more concise and integral package. At the same time, some of these arms are asked to work in increasingly confined and inaccessible areas.

SUMMARY AND OBJECTS

In a mechanism for manipulating robot arms with a position servo at each hinge between an arm and its next-based member, the subject invention adds to such an arm an inertial sensor comprising a precession or gimbal axis carrying a gyroscope, a velocity sensitive restraint, and a signal generator or rotary variable differential transformer (RVDT). These components combine to space stabilize each arm at its hinge. Thus an arm maintains its attitude in space while its base undergoes spurious oscillations. Moreover, the arm attitude may be reversibly adjusted during operation by introducing a null offset to the RVDT input to the servo amplifier. The ratio of velocity restraint to wheel angular momentum (R/M) is dimensionless and sets the arm attitude change for a given null offset. Arm members may be stabilized in this fashion at any or all three orthogonal hinge axes. A three-axis platform from this invention may thus carry on its inner member a camera, an antenna, or other directionally sensitive equipment; while said platform is mounted on a vehicle coursing over land or through sea, air, or space. Transmitting synchros may be included at each hinge to provide a three-wire position signal to repeaters as needed.

For reference later in this text, the objects or goals to be sought in this invention are listed here.
1. Space stabilize robot arm with integral mechanism.
2. Command arm maneuvers while preserving space reference.
3. Accomplish 1 and 2 above at one to three hinge axes.
4. Set R/M ratio for command range.
5. Provide synchro transmitters at servoed hinge axes.
6. Torque at precession axis to reset space reference.

DESCRIPTION OF THE DRAWINGS

FIG. 4 is a sketch in three dimensions of a structure ending in a subassembly which is space stabilized about three axes.

FIG. 5 is a mechanical schematic of components on stick structures in a layout that follows thw pattern of FIG. 4.

FIG. 6A is an end view of an oil-filled velocity sensitive rotary restrainer.

FIG. 6B is a plan view of FIG. 6A.

DESCRIPTION OF PREFERRED EMBODIMENTS

Figure 1:
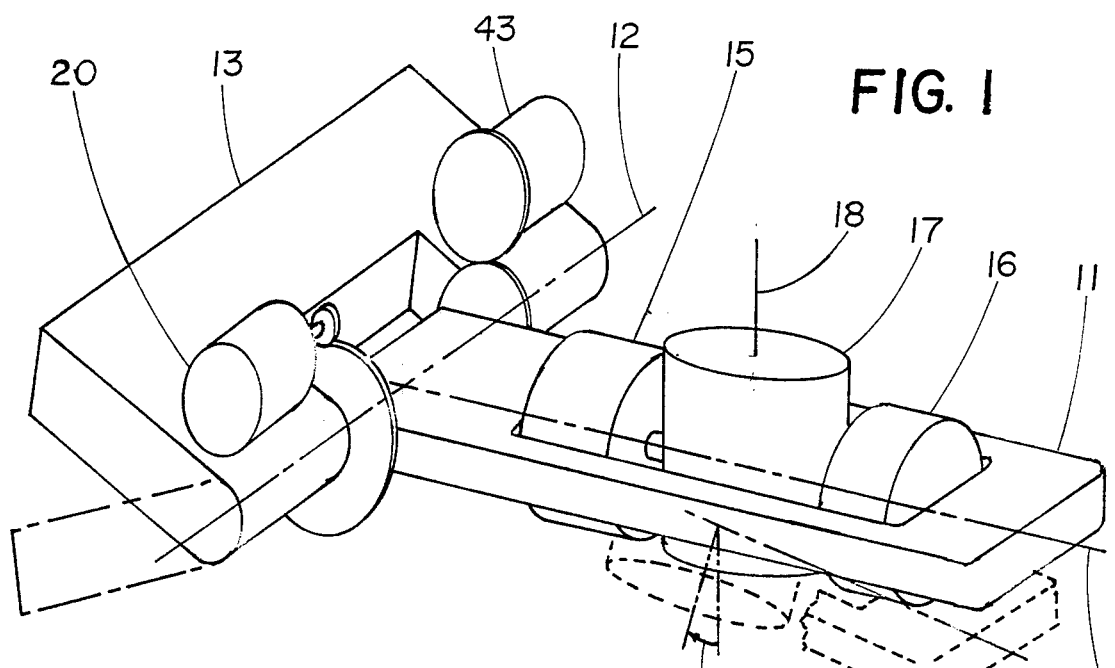
FIG. 1 is a three-dimensional structure schematic showing an arm with its integral components, the base member as it suffers spurious perturbations, and the connecting hinge or servo axis about which the arm is atabilized.

In FIG. 1 arm 11 is to be space stabilized at hinge 12 carried by base member 13. Mounted to arm 11 at its precession axis 14 are the velocity sensitive restraint 15, the rotary variable differential transformer (RVDT) 16, and, pivotally between 15 and 16, gyroscope motor 17. Rotor spin axle 18 in 17 is maintained at some angle, nominally 90 degrees, to hinge 12 so that axes 12, 14, and 18 are mutually perpendicular. To aid in comprehending the gyroscopic action, an experiment is described here. With the gyro wheel up to speed and the base member held firmly, one may push either way on arm 11 about 12 and note that the position of gyro axle 18 as it precesses about 14, will track the deviation of 11 about 12. Press on arm 11 downward and the gyro rotor, spinning counterclockwise as viewed from above, will precess while arm 11 moves as shown dotted in FIG. 1. Press on 11 to return spin axle 18 to its start angle on 14, and arm 11 will take up its start attitude in space. In actual operation, an error signal is developed at RVDT 16 signifying a displacement of 18 about 14, is amplified at 19, and energizes servo motor 20 mounted on base member 13 to exert a torque on arm 11 about hinge 12. Accordingly, any disturbing couple about axis 12 from (1) movement of 13 such as to position 21, (2) unbalance of 11 about 12, or (3) friction at hinge 12 will be counteracted by the servo loop described in order to maintain the space attitude of arm 11.

While the mechanism is operating, a shift in the null position of the error signal from RVDT 16 will command the gyro axle 18 to home about a new angle 22 at precession axis 14 and the system will commence stabilizing arm 11 at a new space attitude 23. This offset in signal null position may be accomplished by adding or cascading a second RVDT output 24 to make up the amplifier input as delineated in FIG. 2. Space reference is preserved when RVDT 24 is adjusted to return the signal input to amplifier 19 to its former null so that arm 11 takes up its start position in space.

This arm attitude response to a signal null offset is affected directly by the restraint characteristic of component 15 in FIG. 1. A plausible design for an oil-filled unit is illustrated in FIGS. 6A and 6B. Looking first at 6B, both ends are sealed. A diaphram at left accommodates a rotary input drive. An expansion bellows at right closes paddle gaps 27 and 28 when the fluid heats and becomes less viscous. The plan of FIG. 6B is taken through FIG. 6A at the section lines so that one of the two oppositely oriented paddles 29 is pictured in 6B as they are keyed from rotation and free to slide axially as compelled by rod 30. In like manner, paddles or impellers 31 are shown single in 6B and are part of a subassembly free to be rotated by drive lever 32 on bearings shown. The fluid should be of fairly inert composition such as Dow Corning 200.

The ratio of arm attitude change to RVDT offset depends on the ratio of component 15 restraint to gyro wheel angular momentum, hereinafter designated R/M. This ratio is dimensionless, both numerator and denominator being expressed in gr.cm.$^2$/sec.; and, when R/M is greater than unity, the arm movement angle is greater than the null offset angle. For instance, for R/M=1.5, a change in the precession angle of 30°, effected by a signal network null shift, calls for a change in stabilized arm attitude of 45°.

Figure 2:
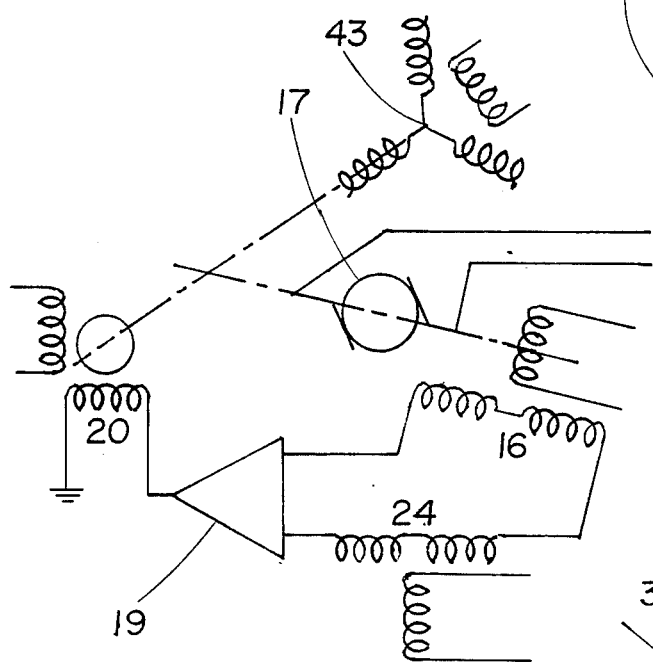
FIG. 2 is an electrical schematic with components arranged on the servo and precession axes in the same pattern as in FIG. 1.
Figure 3:
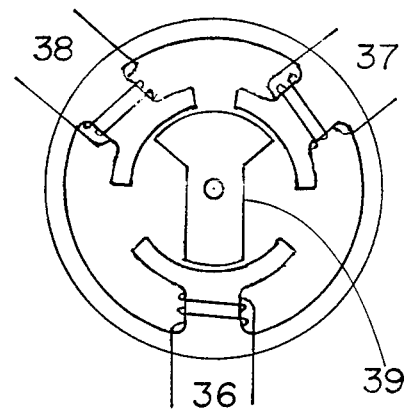
FIG. 3 is an electro-mechanical schematic in plan of a rotary variable differential transformer.

A plausible RVDT (rotary variable differential transformer) design is depicted in FIG. 3 in which the primary winding 36 is excited with an A.C. voltage. The other two windings, 37 and 38, are connected in series opposing to form the secondary or signal output pictured as 16 or 24 in FIG. 2. Movement of rotor 29 from its central position shown will favor flux coupling with one of the secondaries. The signal output will thus have a phase sense and be proportional to said movement. The trim or command unit in FIG. 2 may be remotely situated for easy access.

For cases where other equipment may need to have the angle at the hinge repeated, a synchro transmitter may be provided. For example, in FIG. 1 a synchro 43 is mounted on the base member 13. Meshing with a gear on arm 11, it furnishes a three-wire position signal for use in a remotely situated receiver system. In FIG. 2, the rotor primary for synchro 43 as well as excitation windings for three other servo components are pictured but not identified.

The stabilizing mechanism discussed for FIG. 1 may be duplicated three times over in a single structure. FIGS. 4 and 5 depict an arrangement wherein a crossbar or universal joint supports an inner assembly of gyros and servo components to minimize intercardinal error. Thus member 44 is stabilized from the outside in: (1) in pitch by member 47 with gyro 50 about servo axis 51, (2) in yaw by member 47 with gyro 48 about servo axis 49, and (3) in roll by member 44 with gyro 45 about servo axis 46. Means for actuating hardware issuing from 44 is not treated in this discussion. The base frame is shown as 52 in both FIGS. and may be subjected to random rotary motion in any direction without affecting the space orientation of member 44. In FIG. 5 servo motors are shown with small pinions, and transmitting synchros are shown with 1:1 gearing. FIG. 5 illustrates how most rotating components may be mounted onto the one member 47. Stabilizing an antenna on a land rover may be accomplished with a structure reoriented from FIG. 5. With axes 51 and 49 defining a horizontal plane as roll and pitch, components within 47 would be rearranged to serve a more central center of gravity and axis 46 would protrude vertically as yaw with the antenna assembly secured atop member 44.

An extra component package is shown in FIG. 5 at the precession axes for yaw 56 and for pitch 57. Used as torquers these components will slew member 47 directly around their respective servo axes. Thus a torque from 56 on gyro 48 will move member 47 directly about yaw axis 49 while the stabilization loops are operating normally. The member being stabilized, 47, can thus be made to take up a new space attitude. This control may be useful during initial alignment such as after transport to a new site. However, a torque applied in this fashion (directly about a precession axis) nullifies the space reference that the stabilization loop in question had set up.

The configurations described in this specification are exemplary only. Servo loops may be mechanized in many combinations. Each set of requirements must be separately approached from the standpoint of attaining the optimum design of structure. Novel electromechanical arrangements and devices have been developed for accomplishing all the goals set out for the subject invention that were enumerated earlier.

The foregoing is not intended to prejudice that purpose of a patent which is to cover each new inventive concept therein no matter how others may later disguise it by variations and additions. For instance, the R/M ratio may be altered while the equipment is operating with remote controls for two basic physical properties: (1) speed of the gyro wheel, and (2) velocity sensitive medium in the restrainer. If the viscosity of an oil medium is controlled by a sensor and heater apparatus, a resistance change in the sensor bridge could effect the remote control desired. An electro-magnetic medium such as a drag cup or eddy current brake may serve as the control with a variation in the voltage supply.

I claim:

1. A system for maintaining the space attitude of a robot arm member supported by or hinged to a base undergoing random perturbations, comprising:
   a torque motor mounted along said hinge where said arm is supported by said base;
   a single-degree-of-freedom gyroscope whose first tilt or precession axis is housed perpendicular to its spin axle and, being formed between bearings carried within said arm, is oriented mutually perpendicular to said hinge;
   first rotary differential transformer (RDT) mounted along said precession axis whose voltage output signifies amount and direction of angular inclination of said gyroscope wheel axle from its null position perpendicular to said hinge;
   a velocity sensitive restrainer mounted along said precession axis to brake motion between said gyroscope and said arm and whose action, in combination with gyroscope wheel speed, determines said arm's attitude adjustment per unit angular inclination change of said wheel axle from its normal position of perpendicularity to said hinge;
   second rotary differential transformer (RDT) mounted accessible to the operator whose output is connected in tandem with that of said first RDT and whose rotor is indexed to the position where the null of said second RDT coincides with that of said first RDT such that the output of the two RDTs' network is affected by rotation at either and provides input to an amplifier for said torque motor;
   whereby said arm is ordinarily maintained at a prescribed attitude by said torque motor responding to said first RDT's error signal, and whereby said arm attitude may be adjusted in response to a command rotation of said second RDT rotor, while capable of being exactly reinstated by derotation of said rotor back to said indexed position.

2. A system as defined on claim 1, containing two or more robot arms, each having its attitude adjusted or controlled at its hinge or servoed axis adjoining toward the base.

3. In a system as defined in claim 1, including an addition of an electrical control to change gyroscope wheel speed for altering the attitude adjustment per unit angular inclination change of said wheel axle and thus per unit rotation of said second RDT rotor.

* * * * *